Sept. 20, 1960 J. A. LEE 2,953,382

PLURAL-SPEED GRAMOPHONES

Filed Oct. 17, 1957 2 Sheets-Sheet 1

Sept. 20, 1960 J. A. LEE 2,953,382

PLURAL-SPEED GRAMOPHONES

Filed Oct. 17, 1957 2 Sheets-Sheet 2

Patented Sept. 20, 1960

2,953,382

PLURAL-SPEED GRAMOPHONES

James Alexander Lee, Walthamstow, London, England, assignor to The Plessey Company Limited, Ilford, England, a British company Filed Oct. 17, 1957, Ser. No. 690,878

Claims priority, application Great Britain Oct. 25, 1956

4 Claims. (Cl. 274—9)

This invention relates to plural-speed gramophones of the kind having a pick-up device equipped with a plurality of styli for respective co-operation with different kinds of record grooves, such as standard grooves and micro-grooves, at different turntable speeds. The term gramophone as used in this specification includes all disc-record players irrespective of whether or not they include the means, such as amplifier and loudspeaker, for transforming the stylus movements into sound waves.

It is at present customary to provide gramophones with two interchangeable styli, one for use on standard-groove records, which are to be played at 78 r.p.m., and the other for use on micro-groove records, which are to be played at lower speeds. The use of each stylus on records other than those having the corresponding kind of groove will result in unsatisfactory reproduction or damage to the record or both, and it is therefore an object of the invention to reduce the risk of using the wrong stylus.

A further object of the invention is to provide improved mechanism which upon setting of the speed control member automatically shows that, that stylus which is correct for the chosen speed, is rendered operative for the playing of the next following record without thereby increasing the resistance to tone-arm movement.

According to the invention a speed selector member for the gramophone drive is arranged adjacent to a rest position of the gramophone pick-up member, and a stylus-interchange lever or equivalent element is so arranged as to be coupled with the speed selector member whenever the pick-up member is in the rest position, so that movement of the said selector member from a position corresponding to a speed required for one type of groove to a position corresponding to a speed required for another type of groove will operate the stylus-interchange lever or equivalent element to effect the appropriate change of stylus. If desired, interlocking means may be provided for preventing the speed selector member from being operated to change the speed and/or preventing the stylus-interchange element from being actuated for changing the stylus unless the stylus-interchange element and the speed-selector element are coupled with each other.

In the drawings accompanying the provisional specification, which illustrate one embodiment of the invention:

Figure 1:
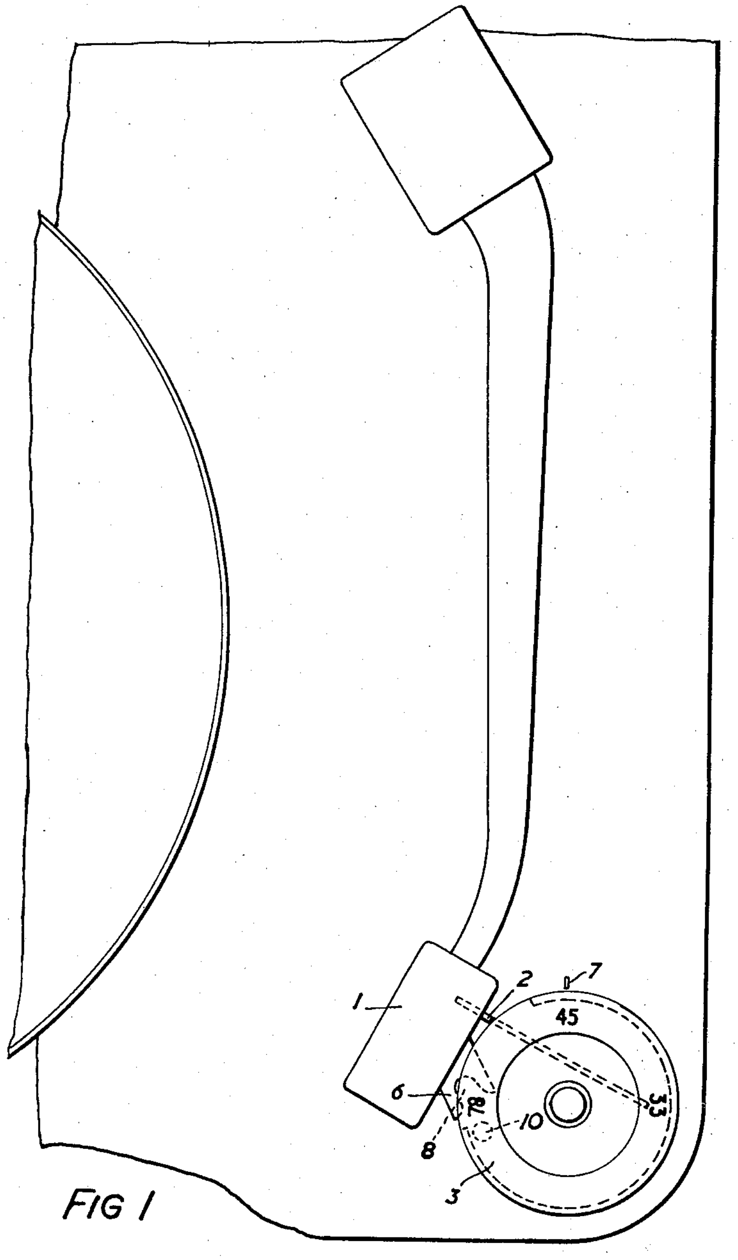
Fig. 1 is a plan view showing the tone arm with pick-up and the speed selector member, together with part of the turntable of a gramophone.
Figure 2:
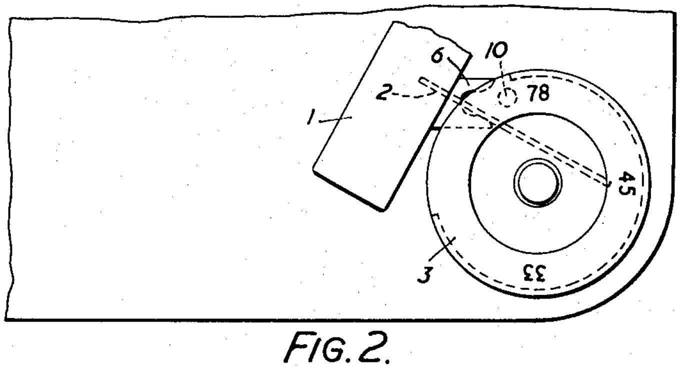
Fig. 2 is a part plan view, showing the pick-up and the speed selector member set for a different speed.
Figure 3:
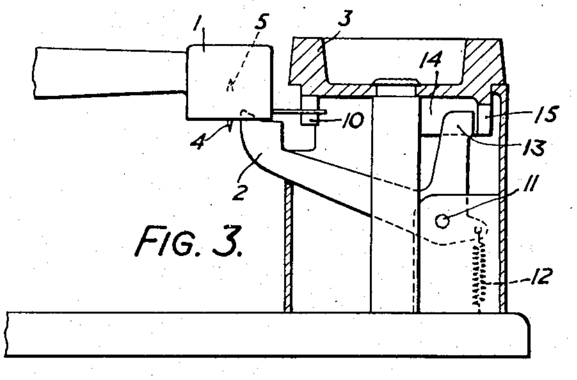
Figs. 3 and 4 are fragmentary sectional elevations illustrating the interlock.

Referring now to the drawings, Fig. 1 shows the pick-up 1 resting on a support member or pick-up rest 2 in a position immediately adjacent the speed-selector knob 3 of the gramophone. The pick-up 1 is equipped with two interchangeable styli or stylus points 4 and 5, respectively adapted for playing micro-groove records and standard-groove records, and with a stylus-interchange lever 6. An index mark 7 shows that the speed selector has been set for 45 r.p.m., and the stylus-interchange lever 6, which projects under the speed-selector knob 3, has accordingly been shown in the microgroove-stylus position. The lever 6 is provided with a longitudinally disposed end slot 8, and a coupling pin 10 projects downwardly from knob 3 as shown more clearly in Fig. 3. The arrangement is such that when knob 3 is turned clockwise from the 45 r.p.m. position shown in Fig. 1 to the 78 r.p.m. position shown in Fig. 2, the pin 10 will enter slot 8 and reverse the lever 6 to the standard-groove stylus position represented in Fig. 2; conversely anti-clockwise rotation of knob 3 from the 78 r.p.m. position (Fig. 2) to the 45 r.p.m. position (Fig. 1) will similarly return lever 6 to the microgroove position, while further anti-clockwise rotation of knob 3 from the 45 r.p.m. position to the 33 r.p.m. or to any other micro-groove speed will leave lever 6 unaffected in the micro-groove-stylus position shown in Fig. 1.

Figure 4:
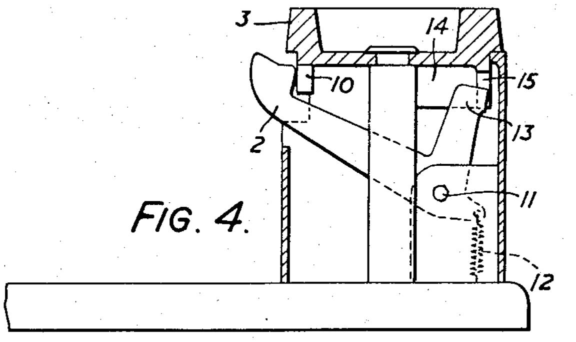

Since the automatic stylus change will only be effected when the pick-up is in its rest position on support 2, means are provided for preventing, except when this condition is fulfilled, such rotation of the knob as would involve the need for stylus interchange. To this end the pick-up rest 2 is constructed as a lever pivoted about a pin 11 and subject to the bias of a light tension spring 12. When the pick-up 1 rests on the support member 2, the weight of the pick-up overcomes the pull of spring 12 and moves the support member 2 into the position shown in Fig. 3, while when the pick-up is in any other position, the pull of spring 12 moves the member 2 into the position shown in Fig. 4, in which an arm 13 of support member 2 enters the path of stop means provided at the underside of knob 3. As shown that stop means is constituted by a collar 14 provided with gaps 15 which the arm 13 is adapted to enter. While a separate gap may be provided for each speed, it may be preferred to provide only two gaps, one corresponding to the 78 r.p.m. position, which requires the standard-groove stylus, and the other covering all the lower speeds, for which the microgroove stylus is required. This enables speed changes between 45 and 33 r.p.m. and, if provided, 16½ r.p.m., to be effected without having to return the pick-up to its rest.

More or less similar locking means may be provided if necessary in the pick-up to prevent reversal of lever 6 except when the pick-up rests on the support 2. Alternatively the lever 6 may be concealed so as not to be readily accessible for manual interference. In this case the pin 10 or equivalent means may be carried by or provided on a tongue or tab extending radially outwardly from knob 3 into a horizontal slot of the pick-up 1. Moreover the position of the pin 10 or its equivalent on the knob 3 and the slot 8 in the lever 6 may be reversed if desired.

What I claim is:

1. In a plural-speed gramophone the combination of a base member, a turntable, a tone-arm rest, a tone arm movable across the turntable and on to said rest, a pick-up member having a plurality of styli mounted on said tone arm, a stylus-selector lever movable in the tone arm member about a substantially vertical axis and having one end projecting laterally from the tone arm member with a longitudinal slot open at said end, said lever being coupled to said pickup member for selectively rendering one or another of said styli operative according to the position of said lever, a plural-speed drive for the turntable including a speed-selector member mounted on the base member adjacent said tone-arm rest for rotation about a vertical axis, from and to any one of a plurality of predetermined positions corresponding to different turntable speeds, and having, spaced from its said axis, a vertically extending pin for co-operation with said slot on said speed-selector member to move the stylus selector lever from a position in which one stylus is operative to a position in which another stylus is operative when said speed selector member is moved from one of said positions requiring said one stylus to another of said positions requiring said other stylus and vice versa, at least one of said positions of said speed selector member being such that the said slot is tangential to the circle of movement of said pin, thus permitting the speed selector to move beyond such position without affecting the position of the stylus selector lever.

2. Apparatus as claimed in claim 1 further including interlocking means normally preventing operation of the speed selector member and feeler means responsive to release said locking means when the tone arm is on its rest.

3. Apparatus as claimed in claim 1, further including locking means for preventing operation of the stylus selector lever and means responsive to release said locking means when the tone arm is on its rest.

4. Apparatus as claimed in claim 1, wherein the tone arm is mounted for limited vertical movement, the apparatus including locking means for the speed selector member, said locking means being coupled with the tone-arm rest so as to be operative to prevent movement of the speed selector member, at least within a predetermined range, when said rest is in an upper position, and spring means urging said rest to said upper position, the force of said spring means being less than the action of the weight of the tone arm when placed on the rest, whereby when the tone arm is placed on the rest, its weight will move the rest to its lower position in which the locking means are inoperative.

References Cited in the file of this patent

UNITED STATES PATENTS

| | | |
|---|---|---|
| 2,689,734 | Wennerbo | Sept. 21, 1954 |
| 2,718,399 | Martin | Sept. 20, 1955 |
| 2,841,399 | Guest | July 1, 1958 |

FOREIGN PATENTS

| | | |
|---|---|---|
| 743,522 | Great Britain | Jan. 18, 1956 |